March 13, 1956 T. W. TURNER 2,737,881
COMBINED FOOD COOKER AND WARMER
Filed June 29, 1951 2 Sheets-Sheet 1

INVENTOR.
Thomas W. Turner
BY
Wilfred E. Lawson
ATTORNEY

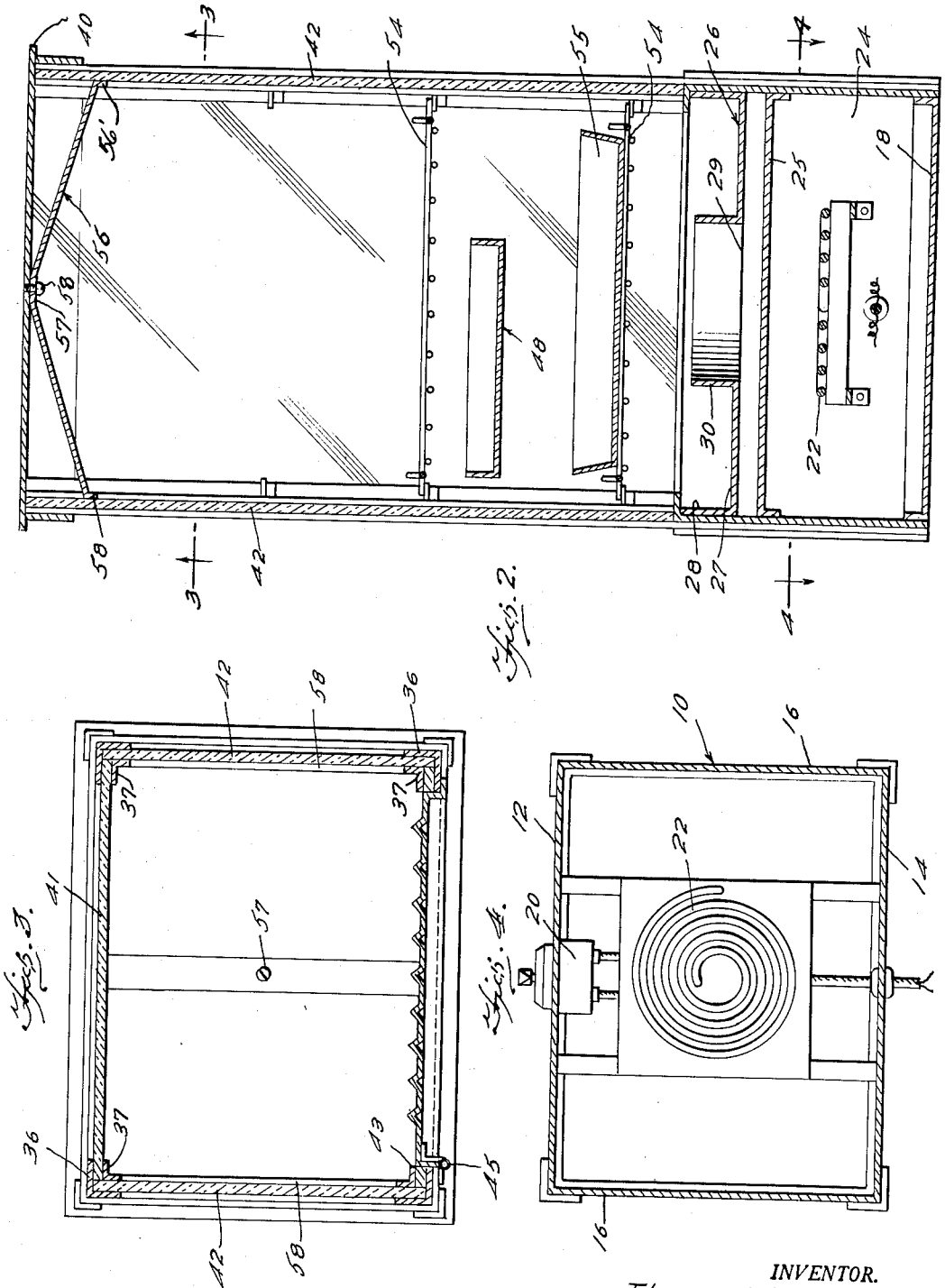

United States Patent Office 2,737,881
Patented Mar. 13, 1956

2,737,881

COMBINED FOOD COOKER AND WARMER

Thomas W. Turner, Newport News, Va.

Application June 29, 1951, Serial No. 234,224

1 Claim. (Cl. 99—339)

This invention relates generally to food cooking and heating or warming devices and is directed particularly to a novel cabinet structure designed to perform both of these functions.

A particular object of the present invention is to provide an improved enclosure or cabinet structure in which food such as frankfurters or the like may be both cooked and kept hot until desired for use and wherein means is provided also for keeping heated the rolls in which the frankfurters are served.

A further and more particular object of the invention is to provide a structure of the character stated which is designed in a novel manner whereby the air within the cabinet structure may be kept at a desired humidity and at the same time at a high temperature, whereby the food will be kept heated as desired but the humidity will not become excessive so as to cause the rolls within the structure to become unduly moist or soggy.

More specifically the invention comprises a glass walled enclosure or cabinet having a heating unit in the lower portion with means overlying the heating unit providing a basin in which water may be kept heated, the basin having a central flue extending therethrough whereby heat from the heating unit may pass directly upwardly into the cabinet for heating the food lying in the cabinet above the water containing basin.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 2 is a vertical sectional view taken transversely of the structure or in a plane parallel with the closed door.

Figure 3 is a horizontal section taken substantially on the line 3—3 of Figure 2.

Figure 4 is a horizontal section taken substantially on the line 4—4 of Figure 2.

Figure 1:
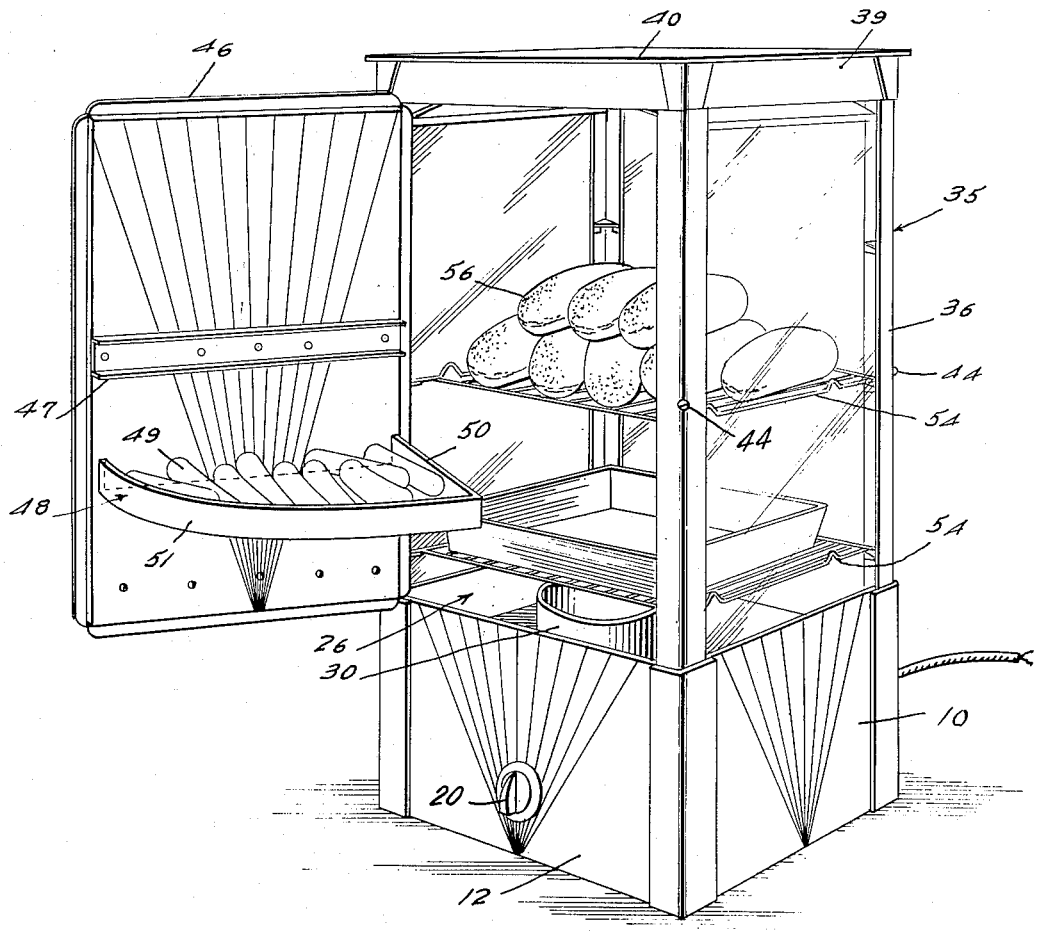
Figure 1 is a view in perspective of a food cooking and heating structure constructed in accordance with the present invention, the same being viewed from the rear and showing the door thereof in open position.

Referring now more particularly to the drawings it will be seen that the device embodying the present invention comprises a bottom or base part 10 which, as shown in Figure 4, comprises the four vertical walls 12, 14 and 16 arranged substantially in a rectangle and joined by the bottom wall 18. The wall 12 constitutes the front wall and has mounted therein an electric control switch 20 by means of which the flow of electric current to a heating unit 22 positioned centrally within the chamber area 24 defined by the walls, is controlled.

Disposed horizontally just above the heating unit 22 is the hot plate 25 which protects the heating coil against material which may fall downwardly through the hereinafter described part of the structure.

In the upper part of the base 10 there is secured, as best seen in Figure 2, a pan or basin which is generally designated 26 and which comprises the bottom 27 and upstanding side walls 28 which are positioned against the walls of the base and secured thereto in a suitable manner. In the central part of the basin 26 is an opening 29 defined by the upwardly extending circular chimney or flue 30.

In the use of the present invention the basin 26 is filled with water to a level closely approaching the top of the chimney or flue 30.

Supported on and above the base 10 is the top or cabinet unit which is generally designated 35. This cabinet unit is here shown as comprising four upright corner posts 36 each of which is secured at its bottom end in a corner of the base and each of which has disposed in the angle thereof, within the cabinet, a molding strip 37 of angular cross section corresponding to the angular section of the adjacent corner post 36. The top ends of the corner post 36 are joined together by the horizontal top frame 39 which is of rectangular form and which carries the cover or roof 40.

The front and the two sides of the cabinet are closed by the glass panels 41 and 42 respectively while the area in the back between the back post 36 provides a door opening 43 by which access is had to the interior of the cabinet.

As shown in Figure 3 the vertical edges of the glass panels 41 and 42 are clamped between the corner posts 36 and the molding strips 37 which are, in turn, coupled together in a conventional manner by screws 44 as shown in Figure 1.

Hinged to one side of the door opening 43 as indicated at 45 in Figure 3, is the door 46 which closes the opening 43 so that the interior of the cabinet is kept well protected against the entrance of dirt or insects when food is contained therein.

Across the inner face of the door 46 is a strengthening bar or rib 47 which is here shown as being in the form of a light channel bar but may be of any other suitable character.

Secured to the inner face of the door preferably close to the lower part thereof is a pan or tray 48. This pan has the straight inner edge 49 which is positioned against the inner face of the door and secured in any suitable manner thereto as by welding or the like while the side edge of the tray nearest to the hinged edge of the door is at right angles to the back edge 49 and is bordered by the upstanding rim 50. Between the outer end of the rim 50 and the end of the edge 49 remote from the hinged side of the door, the pan edge is arcuate and bordered by the arcuate rim 51 which merges with the rim as shown. This pan or tray swings into the cabinet when the door is closed and the bottom of the tray lies directly over the chimney 30.

Figure 5:
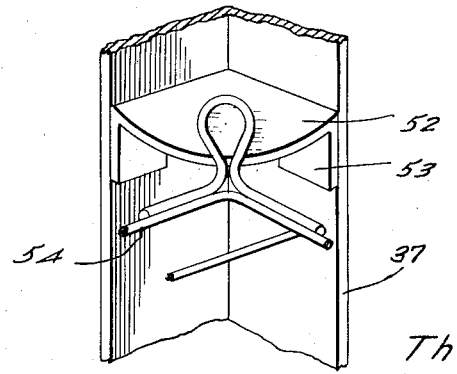
Figure 5 is a detail perspective view showing a corner supporting means for a shelf.

At several vertically spaced locations or planes there are fixed in the angles of the molding strips 37, corner brackets 52, as shown in Figure 5, such brackets being secured in any suitable manner but here shown as having down turned ears 53 which may be spot welded to the strip 37. At each of the stated planes there are four of these corner brackets which support the four corners of a rack or shelf 54.

The lowermost rack or shelf 54 is relatively close to the top of the chimney 30 and is designed to have placed thereon a water pan 55.

The upper shelf may be used for keeping food hot, such as the rolls 56 illustrated in Figure 1.

The present structure is designed primarily for heating and keeping hot frankfurters and frankfurter rolls and Figure 1 illustrates a number of frankfurters in the pan or tray 48 where they may be placed after being suitably grilled or boiled.

In practice, as previously stated, the basin 26 which is directly above the hot plate 25 is filled with water. The rack 54 directly over this basin and over the chimney 30 may be used as a grill on which the frankfurters may be cooked or the frankfurters may be cooked in the pan 55 after which they may be transferred to the tray 48 where they will be kept hot. However, the pan 55 may also be used as a second receptacle for water if and when desired.

In addition to the foregoing the next rack shelf 54 can be filled with rolls as illustrated to be kept for the making of frankfurter sandwiches.

The cooker and heater structure herein disclosed, because of the novel construction in the lower part thereof, providing for the passage of highly heated air from the hot plate 25 upwardly through the chimney 30, will keep frankfurters and rolls in a heated condition ready for serving and at the same time the air will be kept sufficiently low in moisture content to prevent the rolls upon the rack 54 from becoming too moist or soggy.

However, in order to prevent the possibility of condensed moisture ripping onto the rolls from the underside of the top 40 there is provided beneath the top 40 the angular shield 56 which comprises a metal plate of suitable material having the central rib 57 which is positioned against the underside of the top 40 and secured thereto by the screw 58 while the outer edges of the two parts upon either side of the rib 57 are downwardly flanged as indicated at 56' and positioned against the inner face of the glass side panels 42 as shown in Figure 2. Thus any moisture which may collect in the top of the cabinet is carried to the sides thereof. However, due to the novel manner in which the hot air is discharged directly into the cabinet through the water basin 26 the top and side walls of the cabinet are substantially free of moisture at all times.

From the foregoing it will be readily apparent that there is provided by the present invention, a novel cooking and heating structure which is particularly well designed for the serving of frankfurter sandwiches because of the fact that the frankfurter can be both cooked and kept in the sructure and the rolls can also be kept hot ready for use without at the same time being exposed to the danger of becoming soggy.

While in the present illustration of the invention the base and cabinet have been shown as of approximately square cross sectional design and of substantial height, with a single heater and heat chimney in the water basin, it is to be understood that the invention is not confined to the use of a single heat unit as it is contemplated as being within the scope of the present invention to provide a base of elongated rectangular form having a correspondingly formed basin with two or more of the heat discharging flues extending upwardly through the basin and with a corresponding number of heating coils beneath the hot plate underlying the flues.

I claim:

In a food cooking and warming structure, a hollow rectangular metal base having an open top, a heating unit centered within the lower portion of the base, a hot plate overlying the heating unit within the base, a flat relatively shallow liquid receptacle closely spaced above the hot plate and having an area equal to that of the plate, said plate closing off the lower portion of the base to confine the heat generated by the heating unit, a cabinet supported on the base and having its lower end open, a vertical flue centered within the receptacle and opening through the bottom thereof to conduct heat from the hot plate into the cabinet, a pair of vertically spaced reticulated shelves positioned within the cabinet above said receptacle to support food containers for cooking and warming purposes, and a door closed opening in the front side of the cabinet, the lower of said shelves being carried on the inner side of the door to be moved with the door into and out of position between the other of said shelves and said receptacle.

References Cited in the file of this patent

UNITED STATES PATENTS

| Number | Name | Date |
|---|---|---|
| 475,678 | Dexter | May 24, 1892 |
| 739,214 | Phillips | Sept. 15, 1903 |
| 872,353 | Konst | Dec. 3, 1907 |
| 948,149 | Stoddard | Feb. 1, 1910 |
| 1,016,339 | Larsen | Feb. 6, 1912 |
| 1,026,390 | Goff | May 14, 1912 |
| 1,509,752 | Hassler | Sept. 23, 1924 |
| 1,594,187 | Adami | July 27, 1926 |
| 2,025,515 | Jones | Dec. 24, 1935 |
| 2,027,124 | Stockstrom et al. | Jan. 7, 1936 |
| 2,147,335 | De Fazi | Feb. 14, 1939 |
| 2,179,646 | Spartalis | Nov. 14, 1939 |
| 2,447,184 | Jones | Aug. 17, 1948 |
| 2,469,778 | Morici | May 10, 1949 |
| 2,549,019 | Saunders | Apr. 17, 1951 |
| 2,600,760 | Guffey | June 17, 1952 |
| 2,622,186 | Hutchens | Dec. 16, 1952 |